United States Patent [19]

Herd

[11] 3,964,681

[45] June 22, 1976

[54] AGRICULTURAL BROADCASTING APPARATUS

[76] Inventor: Elmer R. Herd, P.O. Box 448, Logansport, Ind. 46947

[22] Filed: Sept. 4, 1975

[21] Appl. No.: 610,294

[52] U.S. Cl. .................................. 239/650; 239/661; 239/681; 239/74; 222/178

[51] Int. Cl.$^2$ .......................................... A01C 19/00

[58] Field of Search ............. 239/650, 661, 73, 665, 239/74, 666, 670, 677, 681, 684, 171, 172, 175; 222/176, 178

[56] References Cited

UNITED STATES PATENTS

| | | | |
|---|---|---|---|
| 2,334,376 | 11/1943 | Bauer | 239/73 |
| 2,537,202 | 1/1951 | Bahre | 239/661 X |
| 3,189,355 | 6/1965 | Swenson et al. | 239/665 X |
| 3,191,944 | 6/1965 | Watts | 222/176 X |
| 3,899,138 | 8/1975 | Lely et al. | 222/178 X |
| 3,905,523 | 9/1975 | Ahlers et al. | 222/176 X |

*Primary Examiner*—Robert S. Ward, Jr.
*Attorney, Agent, or Firm*—D. Paul Weaver

[57] ABSTRACT

A tractor-mounted broadcaster or spreader for granular materials includes a rotary spreader disc and an adjustable gate valve means above the disc and at the outlet of the material hopper. A power cylinder attached to a special support on the hopper operates a rocker arm which in turn is connected with a push-pull cable operatively connected with the movable gate valve element. By this means, the tractor operator inside of the tractor cab can remotely control the discharge of material on to the broadcasting or spreader disc with precision.

9 Claims, 5 Drawing Figures

FIG. 1
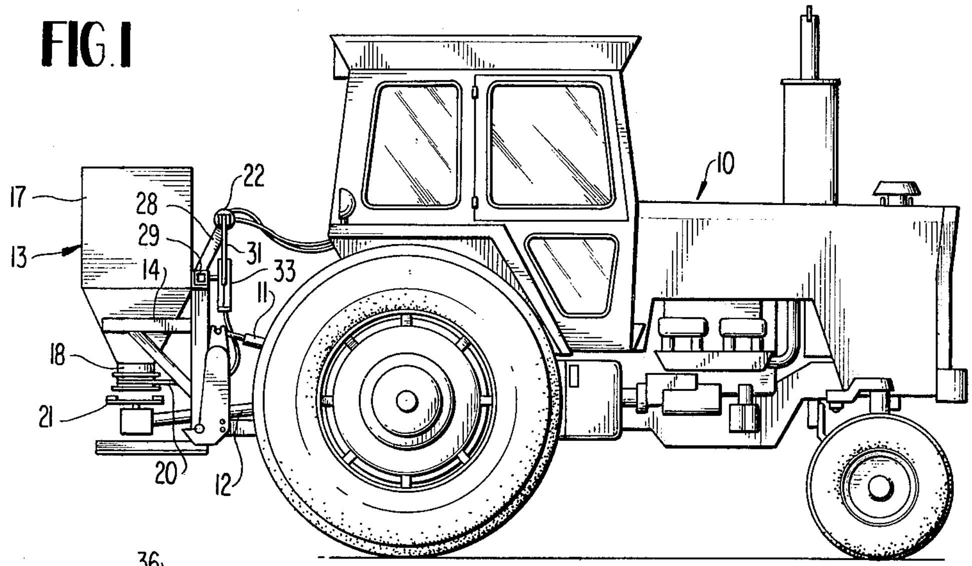
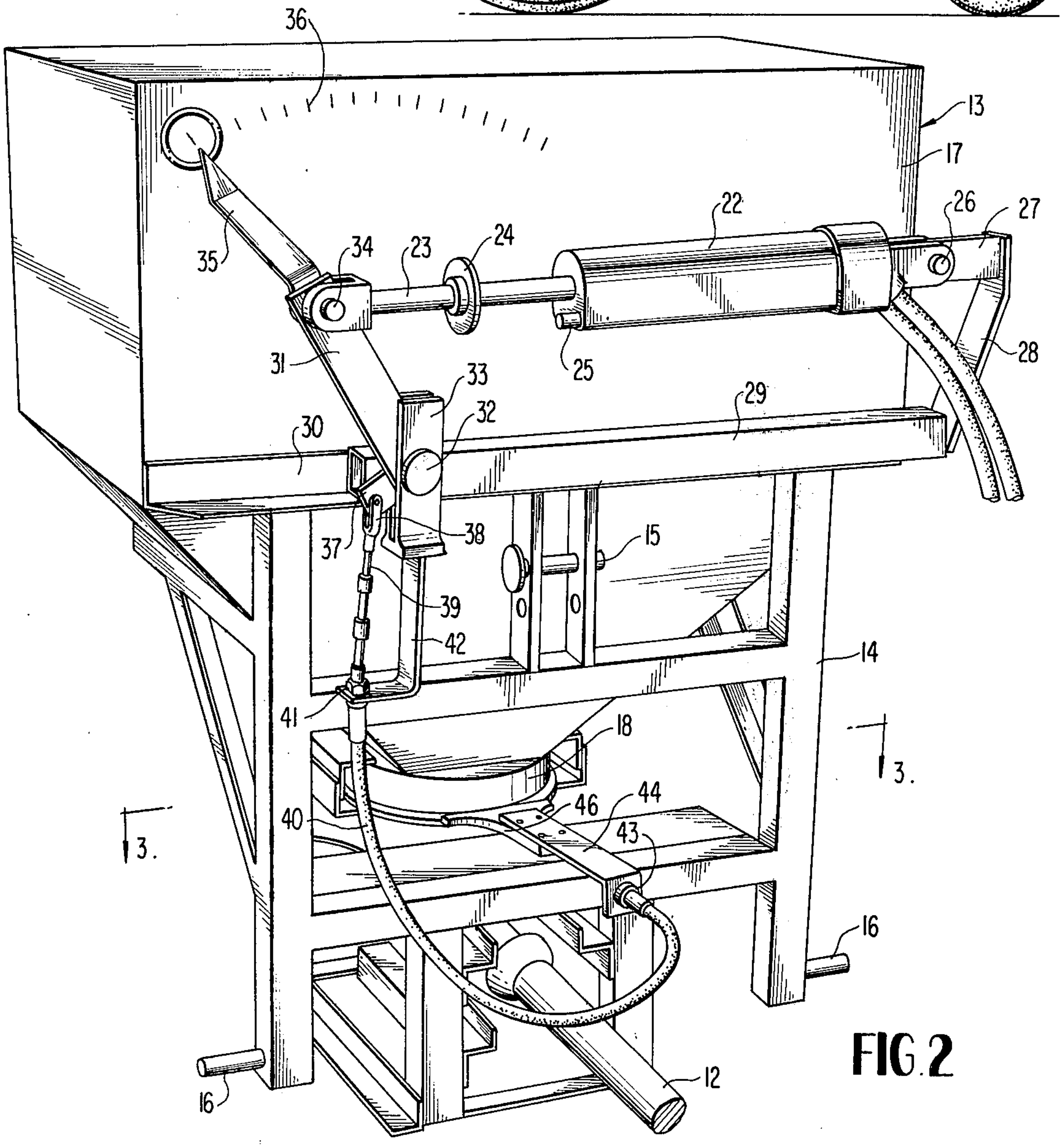
FIG. 2

AGRICULTURAL BROADCASTING APPARATUS

BACKGROUND OF THE INVENTION

The invention is an attachment for broadcasters of the class shown in U.S. Pat. No. 3,287,021, issued Nov. 22, 1966, to Elmer R. Herd. Customarily, in the prior art, the tractor operator must leave the tractor seat in order to open, close or adjust the gating mechanism at the bottom of the seed or fertilizer hopper so as to regulate the discharge of material onto the rotating broadcaster disc. This is obviously inconvenient, time-consuming and costly, particularly in connection with modern day tractors having enclosed air conditioned cabs.

To improve this awkward situation in the prior art, the present invention provides a very simple and economical power mechanism and mechanism support which is attached to the material hopper rearwardly of the tractor cab and is controlled remotely from the interior of the cab by the tractor operator. The mechanism utilizes a standard hydraulic cylinder which is furnished as part of the tractor's equipment and which is operated by simple conventional controls forming a part of the tractor hydraulic system. The entire broadcaster apparatus including the attachment embodying the invention is adapted to be carried by the well-known three point hitch of a tractor.

The invention in two forms additionally features a rocker arm operated by the hydraulic cylinder and an associated push-pull cable, or two cables in one form of the invention, for transmitting movement of the rocker arm in a predetermined ratio to a gate valve element near the outlet of the hopper which serves to regulate the discharge of material from a single or dual outlet opening.

Other features and advantages of the invention will become apparent during the course of the following description.

BRIEF DESCRIPTION OF DRAWING FIGURES

FIG. 1 is a side elevation of a tractor-mounted broadcaster apparatus equipped with the present invention for remotely controlling the discharge of granular material from the hopper.

FIG. 2 is a perspective view of the invention looking rearwardly from the tractor cab.

DETAILED DESCRIPTION OF PREFERRED EMBODIMENTS

Figure 3:
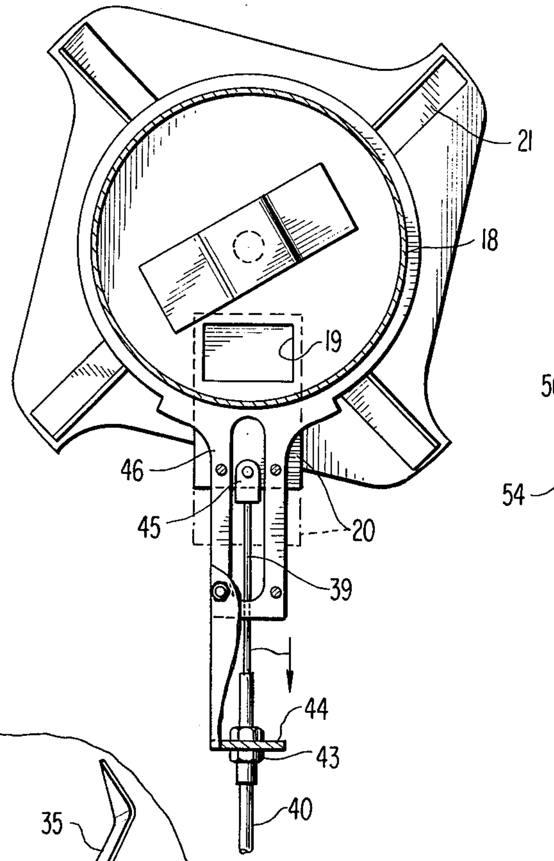
FIG. 3 is a fragmentary horizontal section taken on line 3—3 of FIG. 2.

Referring to the drawings in detail and referring first to FIGS. 1 through 3, wherein like numerals designate like parts, the numeral 10 designates an enclosed cab farm tractor having the customary hydraulically operated three point hitch 11 and a rearwardly extending rotary power take-off shaft 12.

A broadcaster apparatus 13 of the general type shown in the referenced Herd patent is attached bodily through its frame 14 to the three point hitch 11 by attachment elements 15 and 16. The broadcaster apparatus includes a hopper 17 for granular materials having a reduced lower end outlet 18 including a bottom material outlet opening 19, as best shown in FIG. 3. The hopper 17 and associated parts is securely attached to the rigid frame 14. A plate or gate valve element 20 is slidable horizontally immediately below the opening 19 in conventional guideway means, and is operable to completely close or completely open the outlet opening 19 or to partially open the same depending upon requirements. Near and below the outlet opening 19, a vertical axis bladed rotary spreader or broadcaster plate 21 is driven conventionally from the power take-off shaft 12 of the tractor. All of the construction thus far recited is conventional and known in the prior art.

The invention proper is a power attachment to the broadcaster apparatus 13 and comprises a hydraulically operated power cylinder 22 having an extensible and retractable piston rod 23. The power cylinder 22 is of the type commonly supplied with a farm tractor as part of its equipment. An adjustable stop plate 24 on the piston rod 23 cooperates with a stop pin 25 on the cylinder 22 to regulate the extent of retraction of the rod 23 into the cylinder, thereby regulating the extent of movement of the mechanism embodied in the invention, to be further described.

The power cylinder 22 has one end coupled and supported through a pin 26 on a horizontal bracket arm 27 secured to the top of a generally vertical arm 28, having its lower end secured to a sturdy horizontal bar 29, suitably attached to an angle bar 30 on the hopper 17. The cylinder 22 is thus supported generally horizontally near the front of the hopper 17 and somewhat above the mounting bar 29. The elements 29, 28 and 27 may be a welded unit.

A vertically swingable rocker arm 31 or lever is pivotally secured by a pin means 32 to a vertical bracket 33 attached to the mounting bar 29. The upper end of rocker arm 31 is pivotally attached as at 34 with the leading end of piston rod 23 and may carry a pointer extension 35 for cooperation with an imprinted gage scale 36 on the adjacent vertical wall of the hopper 17. The pointer and scale can be observed from the cab of the tractor to indicate the extent of movement of the gating plate 20 during the remote operation of the invention from the tractor cab.

The lower end of rocker arm 31 carries a short substantially right angular extension 37 which is attached to a clevis 38 at one end of a push-pull transmission cable 39 having a relatively stationary sheath 40 coupled at 41 by a conventional fitting to a fixed depending arm 42 on the bracket 33.

The remote end of the sheath 40, FIGS. 2 and 3, is coupled by another fitting 43 to a relatively stationary bracket arm 44 on the lower discharge end 18 of the hopper.

The corresponding end of push-pull cable 39 is attached by another clevis 45, FIG. 3, to the plate or gate valve element 20 which reciprocates horizontally in guideway means 46, as previously stated. In FIG. 3, valve element 20 is shown in the closed position in full lines and in the full open position in broken lines. It may assume any desired intermediate position relative to the outlet opening 19 under control of the cable 39.

In the use of the invention, the tractor operator in the enclosed cab manipulates conventional hydraulic controls to operate the power cylinder 22. As shown in FIG. 2, the gate valve element 20 will be fully closed when the piston rod 23 is extended and the pointer 35 is at the zero point on scale 36. The stop element 24 can be set previously to limit the retractive stroke of piston rod 23. When the operator wishes to fully open or uncover the outlet opening 19, he may retract piston rod 23 until stop elements 24 and 25 come into contact and this point may correspond to the full open position of gate valve element 20. For partially opening the outlet opening 19, the operator may observe the graduated scale 36 which bears a relation to the movement ratio of arms 31 and 37, such as 4-to-1. In this way, the operator can remotely control the gate valve element 20 with precision without ever leaving the tractor seat or cab. As the rod 23 is retracted, the arm 37 is elevated and the cable 39 is pulled upwardly or rearwardly from its point of attachment to the plate 20, thereby shifting the same to uncover the outlet opening 19 to the desired extent. Extension of the rod 23 will cause reverse movement of cable 39 and reverse movement of plate 20 to cover the opening 19. The mechanism is simple, sturdy and direct acting. It is economical, easy to install and requires virtually no attention once installed.

Figure 4:
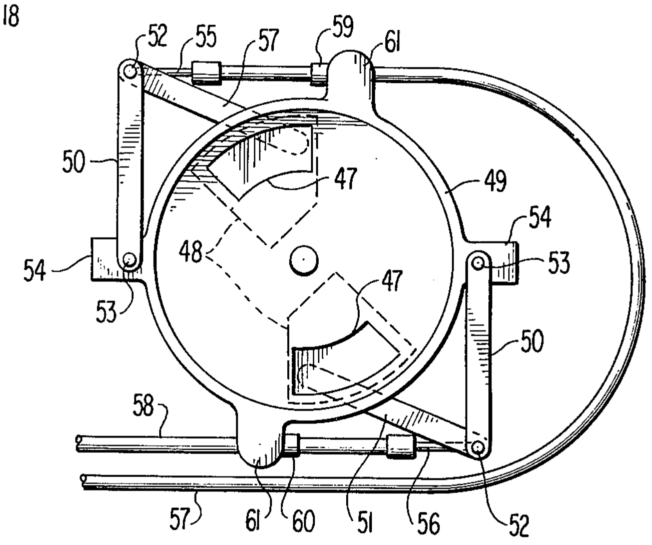
FIG. 4 is a similar view showing a modification of the invention.
Figure 5:
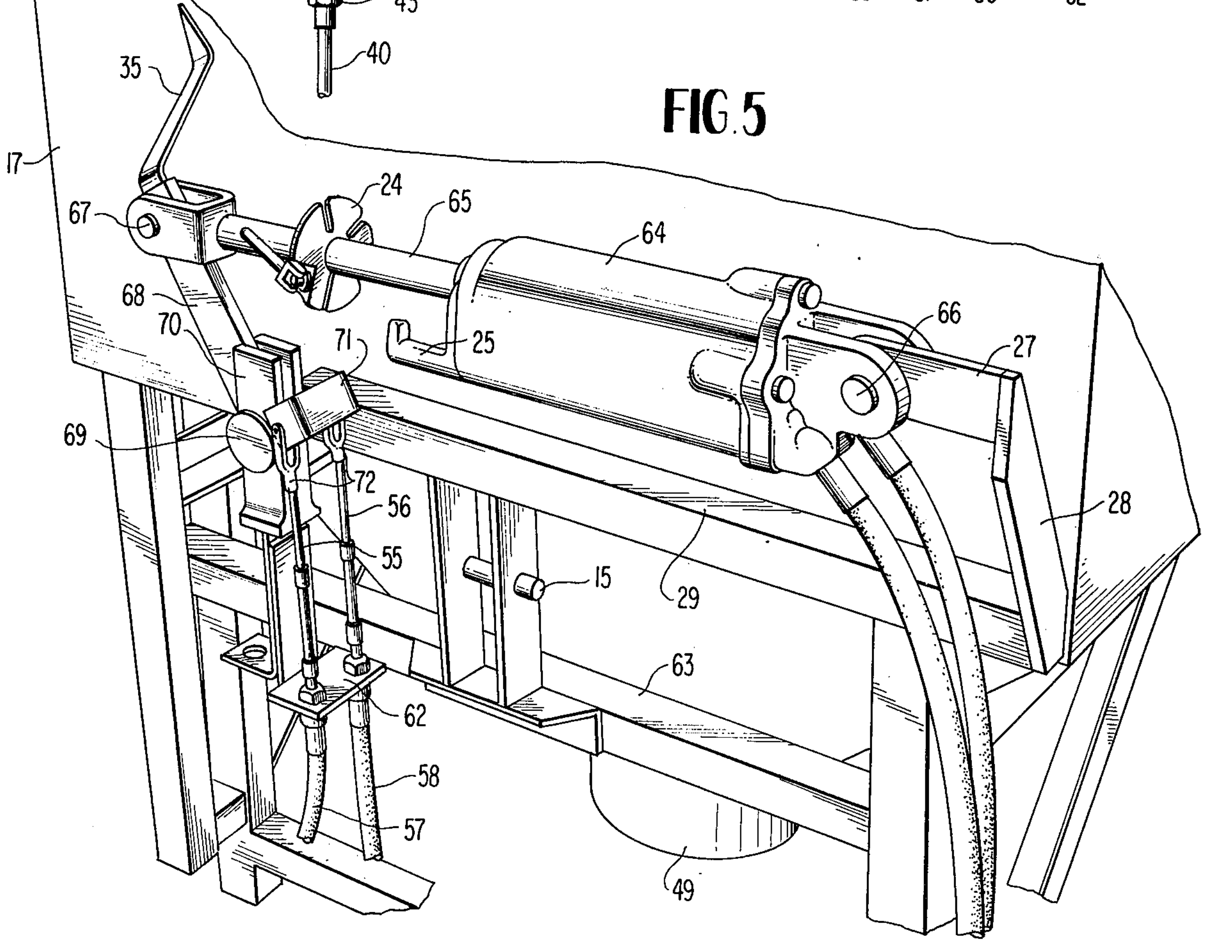
FIG. 5 is a perspective view of the modification similar to FIG. 2.

A modification of the invention is shown in FIGS. 4 and 5, wherein a pair of hopper material discharge openings 47 is utilized in lieu of the single opening 19 in FIG. 3. Instead of the described linear movement plate 20, a pair of rotary closure plates 48 or gate valves are utilized to cover and uncover the openings 47 of the hopper outlet 49. These rotary plates 48 move in a horizontal path under control of pairs of links 50 and 51. Corresponding ends of the links 51 are connected with the rotary plates 48 to move the latter circumferentially. The other corresponding ends of links 51 are pivotally attached at 52 to the adjacent ends of the links 50, having their other ends pivotally attached at 53 to fixed lugs 54 on the hopper outlet 49. The links 50 control the paths of movement of the links 51 under influence of a pair of push-pull cables 55 and 56 whose corresponding ends are suitably connected to the common pivot elements 52.

The two cables 55 and 56 are operated within relatively stationary guides sheaths 57 and 58 secured by fittings 59 and 60 to fixed projections 61 on the hopper structure. The remote terminals of the sheaths 57 and 58, FIG. 5, are anchored to a fixed bracket plate 62 on the broadcaster frame 63 which is essentially identical to the described frame 14.

A hydraulic cylinder 64, similar to the described cylinder 22, has a piston rod 65 extending horizontally therefrom and the cylinder 64 is attached at 66 to the same support structure 27, 28 and 29, previously described, and mounted securely on the hopper 17.

In the modification, FIG. 5, piston rod 65 is pivotally attached at 67 to a rocker arm or lever 68, pivotally mounted through a pin means 69 on a rigid bracket 70 similar to the bracket 33. A short crank extension 71 or loop rigid with the rocker arm 68 and extending substantially at right angles thereto but in the direction opposite to the previously-described extension 37 is attached at its opposite sides to clevises 72 carried by corresponding ends of the two push-pull cables 55 and 56. The movement ratio of elements 68 and 71 is similar to that described for the elements 31 and 37, such as 4-to-1.

During operation of the invention in FIGS. 4 and 5, retraction of the piston rod 65 and the resultant movement of rocker arm 68 swings the extension 71 downwardly rather than upwardly as in the case of the extension 37. Therefore, when the rod 65 is retracted to shift plates 48 to open positions relative to outlet openings 47, such movement is achieved by pushing the two cables 55 and 56 downwardly, FIG. 5, rather than by pulling them upwardly, as in the case of single cable 39 attached to extension 37. The two cables 55 and 56 are moved in unison by the rod 65 and associated elements to shift the two plates or gate valve elements 48 in unison on their circular guideway means. The pairs of links 50 and 51 respond to movement of the cables 55 and 56 in either direction under influence of rod 65 and control the movements of the elements 48.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. Remotely controlled operating mechanism for a tractor mounted broadcaster, said broadcaster having a material discharge opening, a shiftable gate valve element adjacent said opening to regulate the size of the same and a rotary material spreader element beneath the opening and gate valve element, said operating mechanism comprising a support means attached to said broadcaster, a crank arm pivotally mounted on said support means, a remotely controlled power operated extensible and retractable device interconnecting said crank arm and support means, and a shiftable means interconnecting said crank arm and said gate valve element and responding directly to movements of the crank arm to vary the position of the gate valve element relative to said material discharge opening.

2. The structure of claim 1, and said shiftable means comprising a push-pull flexible cable assembly, the gate valve element having a linear path of movement.

3. The structure of claim 1, and said shiftable means comprising a pair of push-pull cable assemblies having corresponding ends connected with said crank arm and said gate valve element, the gate valve element having a circular path of movement.

4. The structure of claim 1, wherein said support means comprises a substantially horizontal bar having an end upstanding arm and said crank arm extending above said bar in opposed relation to said upstanding arm and being vertically swingable and having a lateral extension, said extensible and retractable device comprising a fluid pressure operated cylinder-piston device connected between said upstanding arm and said crank arm and extending substantially horizontally, and said shiftable means comprising a push-pull cable means having one end coupled with said lateral extension of said crank arm and another end coupled with said gate valve element.

5. The structure of claim 1, and a graduated scale on said broadcaster bearing a fixed relationship to the movement of said gate valve element, and a pointer extension on said crank arm adapted to sweep over said graduated scale.

6. The structure of claim 4, and an adjustable rigid stop element on the rod of said cylinder-piston device limiting the retractive movement of said device to a predetermined desired degree.

7. The structure of claim 2, and fixed guide means on said broadcaster for said shiftable gate valve element.

8. The structure of claim 7, and bracket elements on said support means and fixed guide means, said push-pull cable assembly having a sheath, and end coupling means on the sheath coupled with said bracket elements.

9. The structure of claim 1, and said gate valve element being a rotary element, fixed circular guide means on said broadcaster for said rotary gate valve element, and said shiftable means comprising a pair of independent push-pull cables coupled with said rotary gate valve element at circumferentially spaced points thereon and coupled with said crank arm, said crank arm having a lateral extension common to said cables.

* * * * *